United States Patent Office 3,386,987
Patented June 4, 1968

3,386,987
AZO DYES FOR CONTAINING DICARBOXIMIDO GROUPS
Max A. Weaver and David J. Wallace, Kingsport, Tenn., assignors to Eastman Kodak Company, Rochester, N.Y., a corporation of New Jersey
No Drawing. Filed Oct. 8, 1965, Ser. No. 494,247
8 Claims. (Cl. 260—152)

ABSTRACT OF THE DISCLOSURE

Azo compounds having a phenyl-azo-aniline nucleus containing a substituted dicarboximidoalkyl group on the aniline nitrogen atom are useful as dyes for hydrophobic textile materials.

---

This invention relates to azo compounds, especially useful as dyes for textile fibers, yarns and fabrics.

The azo compounds have the general formula (I) 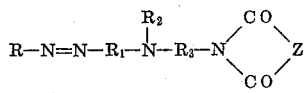

wherein:

R represents a monocyclic carbocyclic aryl group of the benzene series including phenyl and substituted phenyl such as lower alkylphenyl, e.g., o, m, p-tolyl; lower alkoxyphenyl, e.g., o, m, p-methoxyphenyl; halophenyl, e.g., o, m, p-chlorophenyl; nitrophenyl, e.g., o, m, p-nitrophenyl; lower alkylsulfonylphenyl, e.g., o, m, p-methylsulfonylphenyl; lower alkylsulfonamidophenyl, e.g., o, m, p-methylsulfonamidophenyl; lower di(alkylsulfonyl)phenyl, e.g., 2,5-di(methylsulfonyl)phenyl; dicarboxylicacidimidophenyl, e.g., o, m-succinimidophenyl; lower fluoroalkylphenyl, e.g., trifluoromethylphenyl; lower alkanoylamidophenyl, e.g., o, m, p-acetamidophenyl; cyanophenyl, e.g., o, m, p-cyanophenyl; carboxamidophenyl, e.g., o, m, p-carboxamidophenyl; benzamidophenyl; thiocyanophenyl, e.g., o, m, p-thiocyanophenyl; lower alkylthiophenyl, e.g., o, m, p-methylthiophenyl; benzoxyphenyl, e.g., o, m, p-benzoxyphenyl; benzylaminophenyl, e.g., o, m, p-benzylaminophenyl; lower N-alkylbenzaminophenyl, e.g., N-phenylmethylaminophenyl; formylphenyl, e.g., o, m, p-formylphenyl; lower carbalkoxyphenyl, e.g., o, m, p-carbethoxyphenyl; benzoylphenyl, e.g., o, m, p-benzoylphenyl;

$R_1$ represents p-phenylene or p-phenylene substituted with lower alkyl, e.g., methyl-p-phenylene; lower alkoxy, e.g., methoxy-p-phenylene; halogen, e.g., chloro-p-phenylene; lower alkylthio, e.g., methylthio-p-phenylene; lower alkanoylamido, e.g., acetamido-p-phenylene; or lower alkylsulfonamido, e.g., methylsulfonamido-p-phenylene.

$R_2$ represents hydrogen, cycloalkyl or an alkyl radical including unsubstituted alkyl, preferably lower alkyl, i.e., from 1 to 4 carbon atoms, and substituted lower alkyl such as hydroxyalkyl, e.g., hydroxyethyl; polyhydroxyalkyl, e.g., 2,3-dihydroxypropyl; lower alkoxyalkyl, e.g., methoxyethyl; cyanoalkyl, e.g., β-cyanoethyl; lower cyanoalkoxyalkyl, e.g., β-cyanoethoxyethyl, lower alkanoyloxyalkyl, e.g., acetoxyethyl; lower carboalkoxyalkyl, e.g., carbethoxyethyl; halogenoalkyl, e.g., chloroethyl; hydroxyhalogenoalkyl, e.g., β-hydroxy-γ-chloropropyl; lower alkylsulfonylalkyl, e.g., methylsulfonylethyl; lower alkyl-OCOOCH$_2$CH$_2$—, e.g., CH$_3$OCOOCH$_2$CH$_2$—; carboxamidoalkyl, e.g., carboxamidoethyl, phenylcarbamoyloxyethyl, benzyl, phenoxyalkyl, e.g., β-phenoxyethyl; lower alkylsulfonamidoalkyl, e.g., N-methylsulfonamidoethyl; sulfonamidoalkyl, lower alkylsulfonamidoalkyl, e.g., N-methylsulfonamido; lower alkylcarboxamidoalkyl, e.g., ethylcarboxamidoethyl; etc., phenyl and phenyl substituted with lower alkyl, lower alkoxy, chlorine or bromine.

$R_3$ represents lower alkylene;

Z represents one of the groups

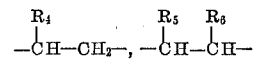

or

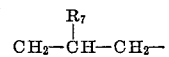

in which $R_4$ represents a phenylcarbamoyloxy group, e.g.,

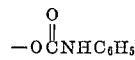

lower alkylcarbamoyloxy, e.g.,

halogen, e.g., chlorine or bromine, mercapto, lower alkylthio, e.g., SCH$_3$, SC$_2$H$_5$, lower alkanoyl, e.g., COCH$_3$, COC$_2$H$_5$, lower alkanoyloxy, e.g.,

amino, lower alkanoylamido, e.g., NHCOCH$_3$,

or carbamoyl; both $R_5$ and $R_6$ represent hydroxyl, halogen or lower alkanoyloxy, e.g., as present in the chains:

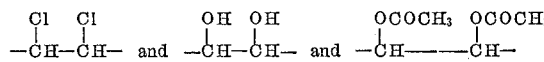

or $R_5$ represents halogen when $R_6$ is hydroxyl or lower alkanoyloxy as present in the chains:

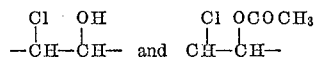

$R_7$ represents halogen, hydroxyl, lower alkoxy or lower alkanoyloxy.

Herein, alkyl, alkylene, lower alkyl and lower alkylene mean the alkyl chain, straight or branch-chained, contains 1 to 4 carbon atoms.

As can be seen from the examples below, the various substituents attached to groups R, $R_1$ and $R_2$ serve primarily as auxochrome groups to control the color of the azo compound. In general, azo compounds very useful as textile dyes are obtained by wide variation of the substituents.

The azo compounds are prepared by coupling salts of the aniline diazo coupling components well-known in the art, with substituted aniline coupling components having the Formula II:

II 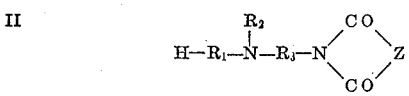

wherein $R_1$, $R_2$, $R_3$ and Z have the above meaning.

The coupling components of Formula II containing the dicarboximido radical are prepared by one of several well known methods illustrated in the examples:

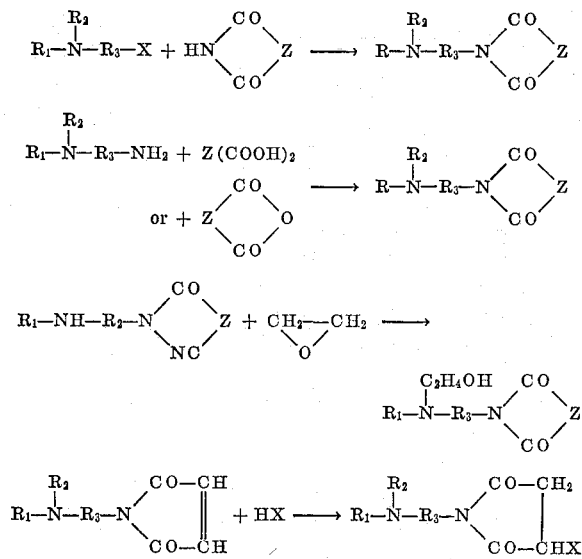

X represents halogen; $R_1$, $R_2$ and $R_3$ are as defined above.

The azo compounds can be used for dyeing textile materials including synthetic polymer fibers, yarns and fabrics giving a variety of fast shades including yellow, red, blue and violet shades when applied by conventional dyeing methods. The azo compounds are useful, for example, for dyeing polyester, polyamide and cellulose acetate fibers and when used for dyeing such hydrophobic fibers should be free of water-solubilizing groups such as carboxyl and sulfo. In general, the azo compounds have good fastness, for example, to light, washing, gas (atmospheric fumes) and sublimation. The azo compounds can also be expected to respond favorably to other textile dye tests such as described in the A.A.T.C.C. Technical Manual, 1964 edition, depending in part upon the particular dye used and fiber being dyed.

The azo compounds of Formula I above are similar in structure to the azo compounds of U.S. 3,148,178 also containing a dicarboximido radical. However, in the compounds of the present invention, in the radical

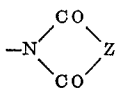

Z does not include the group —$CH_2$—$CH_2$— of the compounds of U.S. 3,148,178, but includes only groups

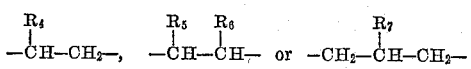

in which the $R_4$-$R_7$ substituents are defined above. The azo compounds of our invention containing these $R_4$-$R_7$ substituents possess unique properties compared to the compounds in which Z represents the group —$CH_2$—$CH_2$—. Our azo compounds possess substantially better fastness, e.g. to sublimation and light and possess better affinity for textile fibers, depending in part upon the substituent $R_4$-$R_7$ in use and the particular fiber being dyed.

The azo compounds of the invention may be used for dyeing hydrophobic fibers such as linear polyester, cellulose ester, acrylic, polyamide, etc, fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The following examples will serve to illustrate our invention.

EXAMPLE 1

(A) Preparation of the coupler.—17.8 g. N-(2-aminoethyl)-N-ethyl-m-toluidine and 13.4 g. malic acid were heated together at 145–150° C. for one hour. The reaction mixture was poured into water and collected by filtration. After recrystallization from 75 ml. of ethanol, the material melted at 98–99° C. The product was obtained in 58% yield and had the following structure:

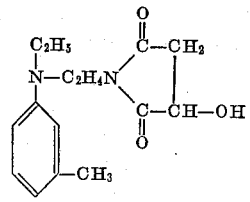

(B) Preparation of the dye.—6.21 g. 2,6-dichloro-4-nitroaniline was dissolved in 37.5 cc. concentrated $H_2SO_4$ at 25° C. The solution was chilled and a solution of 2.2 g. $NaNO_2$ in 15 cc. concentrated $H_2SO_4$ added at less than 5° C. The reaction mixture was stirred at 0–5° C. for two hours and then added to a chilled solution of 8.28 g. N-[2-(N-ethyl-m-toluidino)ethyl]malimide from A in 200 ml. 15% aqueous sulfuric acid below 15° C. The coupling was neutralized with solid ammonium acetate until solution turned Congo red paper brown. After two hours, the mixture was drowned with water, filtered, washed with water, and dried. The product dyed polyester and cellulose acetate fibers a desirable shade of brown at excellent fastness properties. It had the following structure:

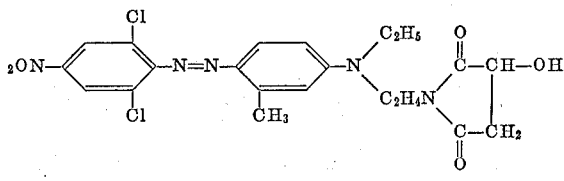

(C) Preparation of the dye (Example 8 of table below).—One gram of the above dye was heated in 5 cc. of acetic acid and 5 cc. of acetic anhydride on a steam bath for one hour. The reaction mixture was drowned into water, filtered and air dried. The product, which had the following structure, dyed cellulose acetate and polyester fibers a deep fast brown shade.

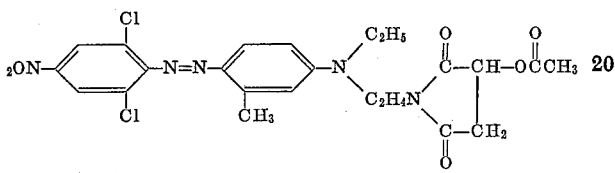

EXAMPLE 2

(A) Preparation of the coupler.—13.8 g. N-[2-(N-ethyl-m-toluidino)ethyl]malimide, (Example 1A) 6.0 g. phenyl isocyanate, 3 drops triethylamine and 100 ml. benzene were refluxed together for 2½ hours. The benzene was evaporated off to yield an oily product, which crystallized on standing. The M.P. after two recrystallizations from ethanol was 103–105° C. This coupler had the following structure:

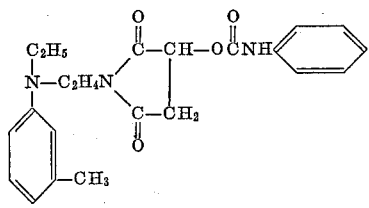

(B) Preparation of the dye.—3.6 g. dry sodium nitrite was dissolved in 25 cc. concentrated $H_2SO_4$ and the solution cooled. To this was added 50 cc. 1:5 acid (1 part propionic to 5 parts acetic acid) below 15° C., followed by 8.6 g. 2-chloro-4-nitroaniline at less than 5° C. There was added 50 cc. more 1:5 acid and the reaction stirred three hours at 0–5° C. The solution was then added to a chilled solution of 19.7 g. N-[2-(N-ethyl-m-toluidino)ethyl] - 2 - hydroxysuccinimide carbanilate, from A, dissolved in 250 cc. 1:5 acid. The coupling was kept cold and neutralized to Congo red paper with solid ammonium acetate. After coupling two hours, the mixture was drowned with water, filtered, washed with water and air dried. The product dyes polyester fibers a deep shade of red with excellent sublimation and light fastness and has the following structure:

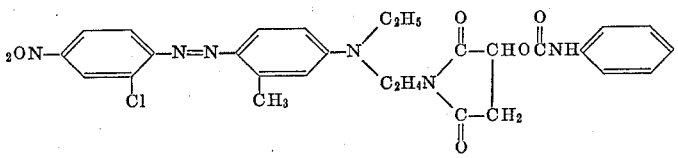

EXAMPLE 3

1.27 g. p-chloroaniline was dissolved in 10 ml. water containing 3 cc. concentrated HCl. Ice was added followed by a solution of 0.72 g. sodium nitrite in 2 ml. water. The solution was stirred 15 minutes, then poured into a solution of 2.76 g. N-[2-(N-ethyl-m-toluidino)ethyl]malimide in 25 cc. dilute HCl containing ice. The coupling solution was neutralized to Congo red paper with ammonium acetate, and allowed to couple cold one hour. The product was filtered, washed with water, and dried at room temperature. This material dyes cellulose acetate, polyester and nylon fibers yellow shades of good fastness properties and has the following structure:

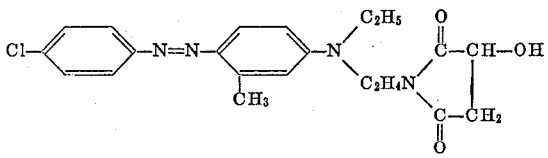

EXAMPLE 4

6.9 g. p-nitroaniline was dissolved in 5.4 cc. concentrated $H_2SO_4$ and 12.6 cc. water. The solution was poured onto 50 g. crushed ice and then a solution of 3.6 g. sodium nitrite in 8 cc. water was added all at once. The reaction was stirred at about 5° C. for one hour resulting in almost complete solution. After filtration, the diazonium solution was added to a chilled solution of 14.7 g. 2-chloro-N-[2-(N-ethyl-m-toluidino)ethyl]succinimide in 250 ml. 15% sulfuric acid. The coupling was neutralized with solid ammonium acetate to brown on Congo red paper. After coupling two hours, the mixture was drowned with water, filtered, washed with water and air dried. The product dyes polyester and cellulose acetate fibers in bright orange shades of good fastness properties. The dye has the structure:

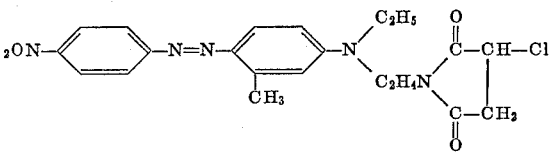

EXAMPLE 5

Preparation of the coupler of Example 45 of table below.—30.0 g. N-2-aminoethyl-m-toluidine and 26.8 g. malic acid were heated together at 150–160° C. for one hour and then at 180° C. for 30 minutes. The reaction mixture was allowed to cool and 20 ml. epichlorohydrin plus 200 ml. ethanol were added. After refluxing 20 hours, the alcohol was evaporated off to yield 69 g. of product which failed to crystallize on standing. The product had the following structure:

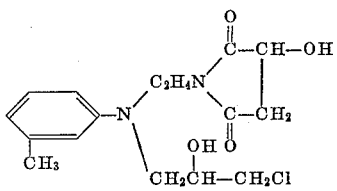

The dyes in the following table were made by one of the above methods and may be identified from the following general formula. The color is that obtained on dyed polyester fabric.

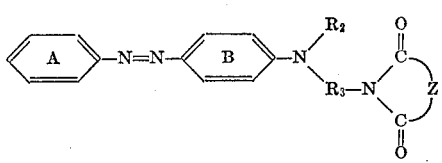

The properties of the compounds of the table are comparable to those of the compounds of the above examples.

TABLE

| Ex. | Substituents on Ring A | Substituents on Ring B | $R_2$ | $R_3$ | Z | Color |
|---|---|---|---|---|---|---|
| 6 | 2,6-di-Cl-4-NO$_2$ | 3-CH$_3$ | —C$_2$H$_5$ | —CH$_2$CH$_2$ | —CH$_2$—CH(Cl)— | Brown. |
| 7 | 2,6-di-Cl-4-NO$_2$ | 3-CH$_3$ | —C$_2$H$_5$ | —CH$_2$CH$_2$ | —CH$_2$CH(SH)— | Do. |
| 8 | 2,6-di-Cl-4-NO$_2$ | 3-CH$_3$ | Phenyl | —CH$_2$CH$_2$ | —CH$_2$CH(OCOCH$_3$)— | Do. |
| 9 | 2,6-di-Cl-4-NO$_2$ | 3-CH$_3$ | —C$_2$H$_5$ | —CH$_2$CH$_2$ | —CH$_2$—CH(COCH$_3$)— | Do. |
| 10 | 2,6-di-Cl-4-NO$_2$ | 3-CH$_3$ | —C$_2$H$_4$CN | —CH$_2$CH$_2$ | —CH$_2$CH(OH)— | Do. |
| 11 | 2,6-di-Cl-4-NO$_2$ | None | —C$_2$H$_4$CN | —CH$_2$CH$_2$ | —CH$_2$CH(OH)— | Orange. |
| 12 | 2,6-di-Cl-4-NO$_2$ | None | —C$_2$H$_4$CN | —CH$_2$CH$_2$ | —CH$_2$CH(OCONH-C$_6$H$_5$)— | Do. |
| 13 | 2,6-di-Cl-4-NO$_2$ | None | —C$_2$H$_4$Cl | —CH$_2$CH$_2$ | —CH$_2$CH(OCONH-C$_6$H$_5$)— | Do. |
| 14 | 2,6-di-Cl-4-NO$_2$ | None | —C$_2$H$_4$OH | —CH$_2$CH$_2$ | —CH$_2$CH(OCONH-C$_6$H$_5$)— | Do. |
| 15 | 2,6-di-Cl-4-NO$_2$ | 3-CH$_3$ | —CH$_2$CH(OH)—CH$_2$Cl | —CH$_2$CH$_2$ | —CH$_2$CH(OCONH-C$_6$H$_5$)— | Brown. |
| 16 | 2,6-di-Cl-4-NO$_2$ | 3-CH$_3$ | —CH$_2$CH(OH)—CH$_2$Cl | —CH$_2$CH$_2$ | —CH$_2$CH(OH)CH$_2$— | Do. |
| 17 | 2,6-di-Cl-4-NO$_2$ | 3-CH$_3$ | —C$_2$H$_5$ | —CH$_2$CH$_2$ | —CH$_2$CH(NH$_2$)— | Do. |
| 18 | 2,6-di-Cl-4-NO$_2$ | 3-CH$_3$ | —C$_2$H$_5$ | —CH$_2$CH$_2$ | —CH$_2$—CH(NHCOCH$_3$)— | Do. |
| 19 | 2,6-di-Cl-4-NO$_2$ | 3-CH$_3$ | —C$_2$H$_5$ | —CH$_2$CH$_2$ | —CH(Cl)—CH(Cl)— | Do. |
| 20 | 2,6-di-Cl-4-NO$_2$ | 3-CH$_3$ | —C$_2$H$_5$ | —CH$_2$CH$_2$ | —CH$_2$—CH(SCH$_3$)— | Do. |
| 21 | 2-Cl-4-NO$_2$ | 3-CH$_3$ | —C$_2$H$_5$ | —CH$_2$CH$_2$ | —CH$_2$CH(OH)— | Red. |
| 22 | 2-Cl-4-NO$_2$ | 3-CH$_3$ | —C$_2$H$_4$CN | —CH$_2$CH$_2$— | —CH$_2$CH(OH)— | Scarlet. |
| 23 | 2-Cl-4-NO$_2$ | 3-CH$_3$ | Phenyl | —CH$_2$CH$_2$— | —CH$_2$CH(OC(O)NH-C$_6$H$_5$) | Do. |
| 24 | 2-Cl-4-NO$_2$ | 3-CH$_3$ | —C$_2$H$_4$Cl | —CH$_2$CH$_2$— | —CH$_2$CH(OC(O)NH-C$_6$H$_5$) | Do. |
| 25 | 2-Cl-4-NO$_2$ | 3-Cl | —C$_2$H$_4$CN | —CH$_2$CH$_2$— | —CH$_2$CH(OC(O)NH-C$_6$H$_5$) | Do. |
| 26 | 2-Cl-4-NO$_2$ | 3-OCH$_3$ | —C$_2$H$_4$CN | —CH$_2$CH$_2$— | —CH$_2$CH(OC(O)NH-C$_6$H$_5$) | Do. |
| 27 | 2-Cl-4-NO$_2$ | 3-NHCOCH$_3$ | —C$_2$H$_4$CN | —CH$_2$CH$_2$— | —CH$_2$CH(OC(O)NH-C$_6$H$_5$) | Do. |

TABLE—Continued

| Ex. | Substituents on Ring A | Substituents on Ring B | $R_2$ | $R_3$ | Z | Color |
|---|---|---|---|---|---|---|
| 28 | 2-Cl-4-NO$_2$ | 3-NHCOCH$_3$ | —C$_2$H$_5$ | —CH$_2$CH$_2$— | —CH$_2$CH(OH)— | Red. |
| 29 | 4-NO$_2$ | 3-CH$_3$ | —C$_2$H$_4$CN | —CH$_2$CH$_2$— | —CH$_2$CH(OCONHC$_6$H$_5$)— | Orange. |
| 30 | 4-NO$_2$ | 3-CH$_3$ | —C$_2$H$_4$CN | —CH$_2$CH$_2$CH$_2$— | —CH$_2$CH(OCONHC$_6$H$_5$)— | Do. |
| 31 | 4-NO$_2$ | 3-CH$_3$ | —C$_2$H$_4$CN | —CH$_2$CH$_2$CH$_2$— | —CH$_2$CH(OH)— | Do. |
| 32 | 4-NO$_2$ | 3-CH$_3$ | —C$_2$H$_4$CN | —CH$_2$CH$_2$CH$_2$— | —CH$_2$CH(CONH$_2$)— | Do. |
| 33 | 4-CO$_2$ | 3-CH$_3$ | —C$_2$H$_4$OCH$_3$ | —CH$_2$CH$_2$— | —CH$_2$CH(CONH$_2$)— | Do. |
| 34 | 4-NO$_2$ | 2-OCH$_3$-5-CH$_3$ | —C$_2$H$_4$OCH$_3$ | —CH$_2$CH$_2$— | —CH$_2$CH(CONH$_2$)— | Red. |
| 35 | 4-NO$_2$ | 2,5-di-OCH$_3$ | —C$_2$H$_4$OCH$_3$ | —CH$_2$CH$_2$— | —CH$_2$CH(CONH$_2$)— | Do. |
| 36 | 2,4-bis-SO$_2$CH$_3$ | 3-CH$_3$ | —C$_2$H$_5$ | —CH$_2$CH$_2$— | —CH$_2$CH(CONH$_2$)— | Do. |
| 37 | 2,4-bis-SO$_2$CH$_3$ | 3-CH$_3$ | —C$_2$H$_5$ | —CH$_2$CH$_2$— | —CH$_2$CH(OH)— | Do. |
| 38 | 2,4-bis-SO$_2$CH$_3$ | 3-CH$_3$ | —C$_2$H$_5$ | —CH$_2$CH$_2$— | —CH$_2$CH(CONH$_2$)— | Do. |
| 39 | 2,4-bis-SO$_2$CH$_3$ | 3-Cl | —C$_2$H$_4$CN | —CH$_2$CH$_2$— | —CH$_2$CH(CONH$_2$)— | Orange. |
| 40 | 2,4-bis-SO$_2$CH$_3$ | 3-Cl | —C$_2$H$_4$CN | —CH$_2$CH$_2$— | —CH(OH)CH(OH)— | Do. |
| 41 | 2,4-bis-SO$_2$CH$_3$ | 3-CH$_3$ | —C$_2$H$_4$CN | —CH$_2$CH$_2$— | —CH(Cl)CH(Cl)— | Do. |
| 42 | 2,4-bis-SO$_2$CH$_3$ | 3-CH$_3$ | —C$_2$H$_5$ | —CH$_2$CH$_2$— | —CH$_2$CH(Cl)CH$_2$— | Red. |
| 43 | 2,4-bis-SO$_2$CH$_3$ | 3-CH$_3$ | —C$_2$H$_5$ | —CH$_2$CH$_2$— | —CH$_2$CH(OH)CH$_2$— | Do. |
| 44 | 2,4-bis-SO$_2$CH$_3$ | 3-CH$_3$ | —C$_2$H$_5$ | —CH$_2$CH$_2$— | —CH$_2$CH(OCOCH$_3$)CH$_2$— | Do. |
| 45 | 2,4-bis-SO$_2$CH$_3$ | 3-CH$_3$ | —C$_2$H$_5$ | —CH$_2$CH$_2$— | —CH$_2$CH(OCH$_3$)CH$_2$— | Do. |
| 46 | 2,4-bis-SO$_2$CH$_3$ | 3-CH$_3$ | —CH$_2$CH(OH)CH$_2$Cl | —CH$_2$CH$_2$— | —CH$_2$CH(OH)— | Do. |
| 47 | 2,4-bis-SO$_2$CH$_3$ | 3-CH$_3$ | —CH$_2$CH(OH)CH$_2$Cl | —CH$_2$CH$_2$— | —CH$_2$CH(OCOCH$_3$)— | Do. |
| 48 | 2-Cl-4,6-di-NO$_2$ | 3-CH$_3$ | —CH$_2$CH(OH)CH$_2$Cl | —CH$_2$CH$_2$— | —CH$_2$CH(OCOCH$_3$)— | Violet. |
| 49 | 2-Cl-4,6-di-NO$_2$ | 3-OCH$_3$ | —C$_2$H$_5$ | —CH$_2$CH$_2$— | —CH$_2$CH(OH)— | Do. |
| 50 | 2-Cl-4,6-di-NO$_2$ | 3-OCH$_3$ | —C$_2$H$_5$ | —CH$_2$CH$_2$— | —CH$_2$CH(OCOCH$_3$)— | Do. |
| 51 | 2-Cl-4,6-di-NO$_2$ | 3-NHCOCH$_3$ | —C$_2$H$_5$ | —CH$_2$CH$_2$— | —CH$_2$CH(OCOCH$_3$)— | Blue. |
| 52 | 2-Cl-4,6-di-NO$_2$ | 2-OCH$_3$-5-NHCOCH$_3$ | —C$_2$H$_5$ | —CH$_2$CH$_2$— | —CH$_2$CH(OH)— | Do. |
| 53 | 2-Cl-4,6-di-NO$_2$ | 2-OCH$_3$-5-NHCOCH$_3$ | —CH$_2$CH(OH)CH$_2$Cl | —CH$_2$CH$_2$— | —CH$_2$CH(OH)— | Do. |

TABLE—Continued

| Ex. | Substituents on Ring A | Substituents on Ring B | R₂ | R₃ | Z | Color |
|---|---|---|---|---|---|---|
| 54 | 2-Cl-4,6-di-NO₂ | 2-OCH₃-5-NHCOCH₃ | —C₂H₄N(CO—)(CO—)Z | —CH₂CH₂— | —CH₂CH(OH)— | Do. |
| 55 | 2-Cl-4,6-di-NO₂ | 2-OCH₃-5-NHCOCH₃ | —C₂H₄N(CO—)(CO—)Z | —CH₂CH₂— | —CH₂CH(COCH₃)— | Do. |
| 56 | 2-CN-4,6-di-NO₂ | 2-OCH₃-5-NHCOCH₃ | —C₂H₄N(CO—)(CO—)Z | —CH₂CH₂— | —CH₂CH(COCH₃)— | Do. |
| 57 | 2-CN-4,6-di-NO₂ | 2,5-di-OCH₃ | —C₂H₅ | —CH₂CH₂— | —CH₂—CH(OH)— | Do. |
| 58 | 2-CN-4,6-di-NO₂ | 3-Cl | —C₂H₅ | —CH₂CH₂— | —CH₂—CH(OH)— | Violet. |
| 59 | 2-CN-4,6-di-NO₂ | 3-OCH₃ | —C₂H₅ | —CH₂CH₂— | —CH₂—CH(OH)— | Do. |
| 60 | 4-SO₂CH₃ | 2-CH₃ | H | —CH₂CH₂— | —CH₂—CH(OH)— | Yellow. |
| 61 | 4-SO₂CH₃ | 3-CH₃ | —C₂H₄CN | —CH₂CH₂— | —CH₂—CH(OH)— | Do. |
| 62 | 4-SO₂CH₃ | 3-CH₃ | —C₂H₄Cl | —CH₂— | —CH₂—CH(OH)— | Do. |
| 63 | 4-SO₂CH₃ | 3-CH₃ | —C₂H₅ | —CH₂—CH(CH₃)— | —CH₂—CH(OH)— | Orange. |
| 64 | 4-SO₂CH₃ | 3-CH₃ | —C₂H₅ | —CH₂—CH(CH₃)— | —CH₂CH(Cl)— | Do. |
| 65 | 4-SO₂CH₃ | 3-CH₃ | —C₂H₅ | —CH₂—CH(CH₃)— | —CH₂CH(OCOCH₃)— | Do. |
| 66 | 4-COCH₃ | 3-CH₃ | —C₂H₅ | —CH₂CH₂— | —CH₂CH(OCOCH₃)— | Do. |
| 67 | 4-COCH₃ | 3-CH₃ | —C₂H₄OCOCH₃ | —CH₂CH₂— | —CH₂CH(OCONHC₆H₅)— | Do. |
| 68 | 4-COCH₃ | 3-CH₃ | —C₂H₄OCONHC₆H₅ | —CH₂CH₂— | —CH₂CH(OCONHC₆H₅)— | Do. |
| 69 | 4-COCH₃ | 3-CH₃ | —C₂H₄SO₂CH₃ | —CH₂CH₂— | —CH₂CH(OCONHC₆H₅)— | Do. |
| 70 | 4-COCH₃ | 3-CH₃ | —C₂H₄OCOC₂H₅ | —CH₂CH₂— | —CH₂CH(OCONHC₆H₅)— | Do. |
| 71 | 4-COCH₃ | 3-CH₃ | —C₂H₄NHCOCH₃ | —CH₂CH₂— | —CH₂CH(OCONHC₆H₅)— | Do. |
| 72 | 3-CF₃ | 3-CH₃ | —C₂H₅ | —CH₂CH₂— | —CH₂CH(OCONHC₆H₅)— | Yellow. |
| 73 | 3-CF₃ | 3-CH₃ | —C₂H₄NHSO₂CH₃ | —CH₂CH₂— | —CH₂CH(OH)— | Do. |
| 74 | 3-SO₂NH₂ | 3-CH₃ | —C₂H₅ | —CH₂CH₂— | —CH₂CH(OH)— | Do. |

TABLE—Continued

| Ex. | Substituents on Ring A | Substituents on Ring B | $R_2$ | $R_3$ | Z | Color |
|---|---|---|---|---|---|---|
| 75 | 3-SO$_2$NH$_2$ | 3-CH$_3$ | —C$_2$H$_4$CN | —CH$_2$CH$_2$— | —CH$_2$CH(OH)— | Do. |
| 76 | 4-SO$_2$N(CH$_3$)$_2$ | 3-CH$_3$ | —C$_2$H$_4$CN | —CH$_2$CH$_2$— | —CH$_2$CH(OH)— | Orange. |
| 77 | 4-CHO | 3-CH$_3$ | —C$_2$H$_4$CN | —CH$_2$CH$_2$— | —CH$_2$CH(OH)— | Do. |
| 78 | 4-CHO | 3-CH$_3$ | —C$_2$H$_5$ | —CH$_2$CH$_2$— | —CH$_2$CH(OH)— | Do. |
| 79 | 4-NHCOCH$_3$ | 3-CH$_3$ | —C$_2$H$_5$ | —CH$_2$CH$_2$— | —CH$_2$CH(OH)— | Yellow. |
| 80 | 4-NHSO$_2$CH$_3$ | 3-CH$_3$ | —C$_2$H$_5$ | —CH$_2$CH$_2$— | —CH$_2$CH(OH)— | Do. |
| 81 | 4-CH$_3$ | 3-CH$_3$ | —C$_2$H$_5$ | —CH$_2$CH$_2$— | —CH$_2$CH(OH)— | Do. |
| 82 | 4-Cl | 3-CH$_3$ | —C$_2$H$_5$ | —CH$_2$CH$_2$— | —CH$_2$CH(OCONHC$_6$H$_5$)— | Do. |

The invention has been described in considerable detail with particular reference to certain preferred embodiments thereof, but it will be understood that variations and modifications can be effected within the spirit and scope of the invention as described hereinabove, and as described in the appended claims.

What we claim is:

1. A water-insoluble azo compound having the formula

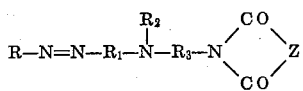

wherein:

R represents a monocyclic, carbocyclic aryl group;
R$_1$ represents p-phenylene or p-phenylene substituted with lower alkyl, lower alkoxy, chlorine, bromine, lower alkylsulfonamido, lower alkylthio, or lower alkanoylamido;
R$_2$ represents hydrogen; lower alkyl; lower alkyl substituted with hydroxy, lower alkoxy, cyano, lower cyanoalkoxy, lower alkanoyloxy, lower carboalkoxy, chlorine, bromine, lower alkylsulfonyl, lower alkylsulfonamido, carboxamido, N-lower alkylcarboxamido, phenoxy, sulfonamido, N-lower alkylsulfonamido, or phenylcarbamoyloxy; lower alkyl-OCOOCH$_2$CH$_2$— phenyl; or phenyl substituted with lower alkyl, lower alkoxy,chloro, or bromo;
R$_3$ represented lower alkylene; and
Z represents

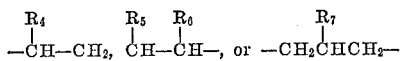

wherein:
R$_4$ represents phenylcarbamoyloxy, lower alkylcarbamoyloxy, chlorine, bromine, mercapto, lower alkylthio, lower alkanoyl, lower alkanoyloxy, hydroxyl, amino, lower alkanoylamido, or carbamoyl;
R$_5$ and R$_6$ both represent hydroxyl, chlorine, bromine, or lower alkanoyloxy, or R$_5$ represents chlorine or bromine when R$_6$ is hydroxyl or lower alkanolyloxy; and R$_7$ represents chlorine, bromine, hydroxyl, lower alkoxy or lower alkanoyloxy.

2. An azo compound according to claim 1 wherein R represents phenyl or phenyl substituted with chlorine, bromine, nitro, lower alkylsulfonyl, or cyano; and
R$_2$ represents lower alkyl or lower alkyl substituted with hydroxy chlorine, bromine, cyano, or lower alkanoyloxy.

3. A water-insoluble azo compound having the formula

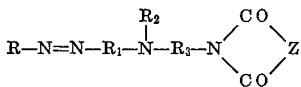

wherein:

R represents 2,6-di-chloro-4-nitrophenyl or 2-chloro-4-nitrophenyl;
R$_1$ represents p-phenylene or p-phenylene substituted with lower alkyl;
R$_2$ represents ethyl or 2-cyanoethyl;
R$_3$ represents ethylene; and
Z represents

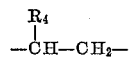

wherein R$_4$ is hydroxy, lower alkanoyloxy, phenylcarbamoyloxy or lower alkylcarbamoyloxy.

4. The compound

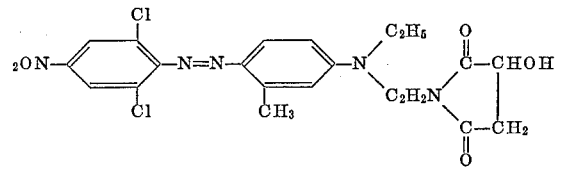

5. The compound

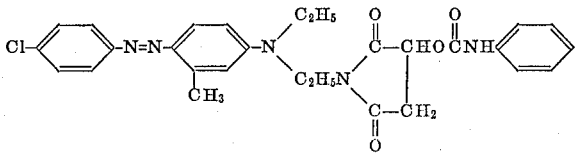

6. The compound
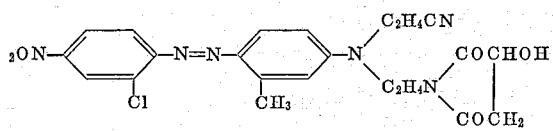
7. The compound
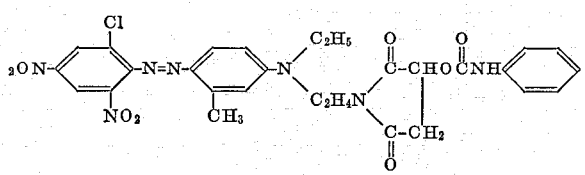
8. The compound
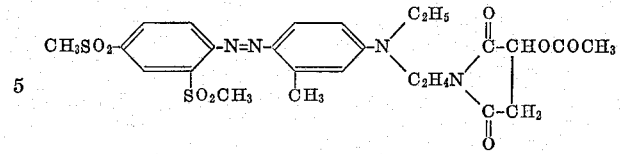
References Cited
UNITED STATES PATENTS
| | | | |
|---|---|---|---|
| 2,804,455 | 8/1957 | Dorlars et al. | 260—152 XR |
| 3,148,178 | 9/1964 | Wallace et al. | 260—152 |
| 3,148,180 | 9/1964 | Straley et al. | 260—152 XR |
FLOYD D. HIGEL, *Primary Examiner.*